United States Patent [19]

Gilmer

[11] 4,227,054
[45] Oct. 7, 1980

[54] DIGITAL CONSTANT-PERCENT BREAK PULSE CORRECTOR

[75] Inventor: John L. Gilmer, Falls Church, Va.

[73] Assignee: Bell Telephone Laboratories, Incorporated, Murray Hill, N.J.

[21] Appl. No.: 965,471

[22] Filed: Dec. 1, 1978

[51] Int. Cl.$^2$ .............................................. H04Q 1/36
[52] U.S. Cl. .............................. 179/16 EA; 328/164
[58] Field of Search .......... 179/16 E, 16 EA, 15 AD; 328/44, 164; 307/222 R; 325/13; 178/70 R, 70 TS

[56] References Cited

U.S. PATENT DOCUMENTS

| | | | |
|---|---|---|---|
| 3,544,724 | 12/1970 | Pento | 179/16 E |
| 3,671,875 | 6/1972 | Pento | 179/16 E |
| 3,700,821 | 10/1972 | Savage | 179/16 E |
| 4,001,698 | 1/1977 | Allred | 328/55 |
| 4,071,708 | 1/1978 | Kaplan et al. | 179/16 E |

Primary Examiner—John H. Wolff
Assistant Examiner—Randall P. Myers
Attorney, Agent, or Firm—Thomas Stafford

[57] ABSTRACT

Constant-percent break pulse correctors ensure that the break interval of a dial pulse signal subsists for a substantially constant percentage of the total dial pulse interval, i.e., break interval plus make interval. The pulse corrector also delays via an operate timer and a release timer initiation of pulse correction cycles and other supervisory functions. Erroneous generation of corrected output dial pulses is effectively eliminated by completely isolating the release timer from the pulse corrector and by controlling the operate timer to generate a single narrow output pulse for initiating only one pulse correction cycle during each valid operate interval. The pulse corrector employs a control arrangement in conjunction with a counter to initiate a pulse correction cycle upon detection of a valid operate interval. Detection of a valid operate interval by the counter reaching a first maximum count also causes the counter to be set to a second count lower than the first maximum count and to be inhibited from counting up until the counter reaches a prescribed initial count. The time interval required to reach the prescribed initial count from the second count is sufficiently long to prevent initiation of erroneous pulse correction cycles in response to noise. The pulse corrector is capable of detecting dial pulses having a predetermined make interval.

8 Claims, 3 Drawing Figures

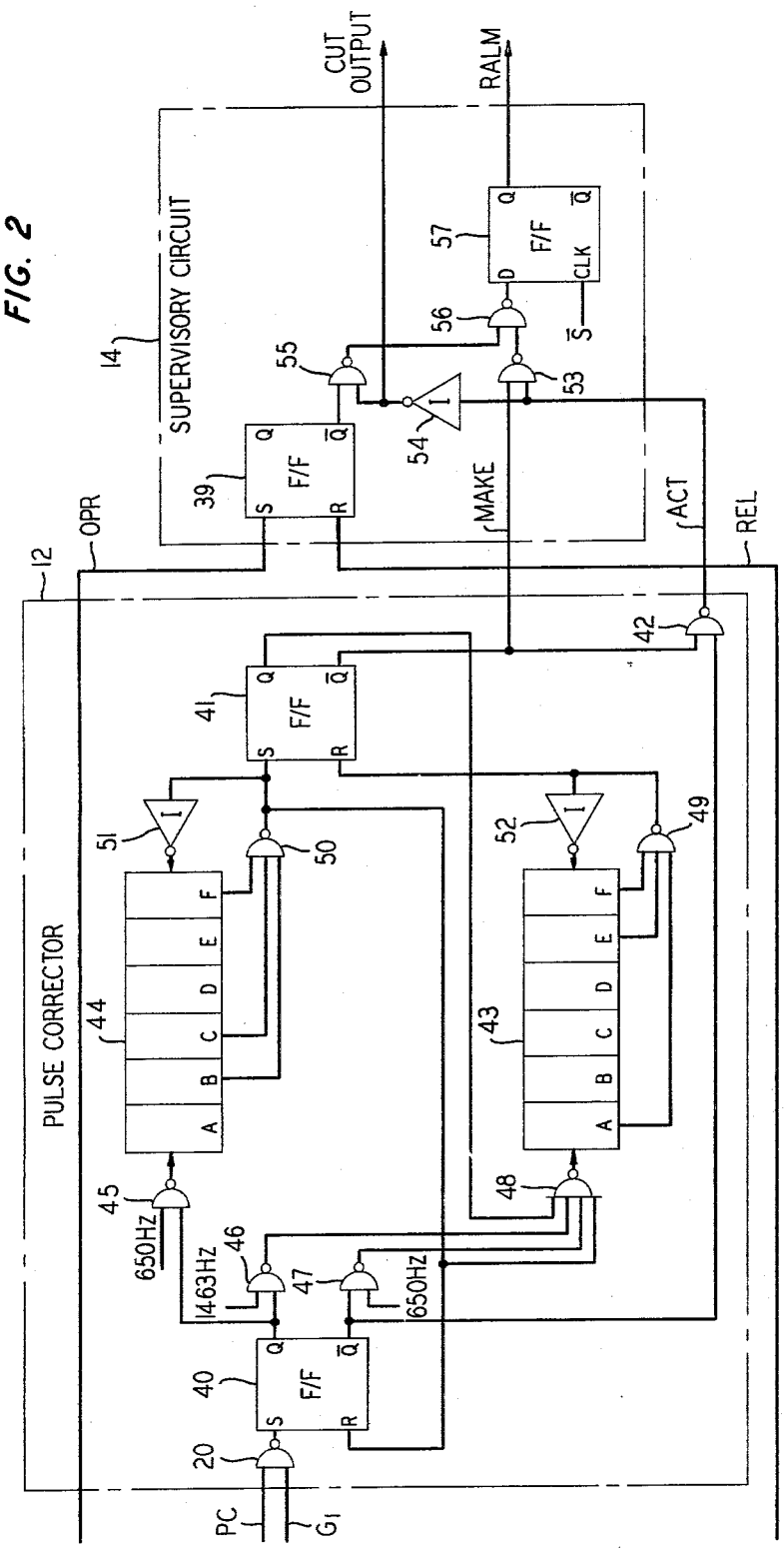

DIGITAL CONSTANT-PERCENT BREAK PULSE CORRECTOR

TECHNICAL FIELD

This invention related to pulse signal transmission and reception systems and, more particularly, to pulse reshaping and repeating, for example, dial pulse correction.

BACKGROUND OF THE INVENTION

Numerous circuits and systems employ pulse signals to initiate, activate, or otherwise control circuit and/or system functions. Most often the pulse signals are required to be within specified limits as to duration, duty cycle, and the like. In telecommunications systems, for example, pulse signals are employed for numerous purposes. of particular interest are supervisory signals employed in signaling systems. Supervisory signals include, among others, operate and release control signals and dial pulses; it being important that the operate and release functions, although used for initiating dial pulse correction, not interfere with the dial pulse correction function.

One characteristic of dial pulses which is of particular importance is the so-called break interval and its percentage of the overall dial pulse interval, i.e., break plus make intervals. As is known, dial pulses may be received which vary in repetition rate from some minimum, for example, 7.5 pulses per second (pps) to some maximum, for example, 12.5 pps. It is important in certain system applications that the percentage of the individual dial pulse break interval be substantially constant relative to the overall dial pulse interval over a desired range of incoming dial pulse rates.

A number of arrangements are known which tend to generate dial pulse signals corrected to a substantially constant percentage break interval over a range of incoming dial pulse rates. The prior known arrangements include both analog and digital implementations. The analog arrangements typically include a plurality of analog resistor/capacitor (RC) timer circuits to realize desired functions. In one known analog arrangement a tandem arrangement of an operate delay timer, release delay timer, make timer and break timer is employed in conjunction with output logic elements to obtain the desired constant percent break pulse correction. In this arrangement the RC time constant of the break timer is controlled by the make timer in response to the incoming dial pulses to yield the desired break interval ratio to the overall pulse interval of make plus break intervals.

Another analog implementation has employed so-called integrating timer circuits of a type disclosed in U.S. Pat. No. 4,001,698 issued to R. R. Allred on Jan. 4, 1977 for the operate delay timer, release delay timer, make timer and break timer.

One problem common to the analog implementations is that they employ capacitors and other analog circuit components. Circuits which use capacitors and other analog circuit components are not readily implemented in integrated form. Indeed, with the advent of large-scale integration it becomes highly desirable to implement pulse repeating and correcting circuits by utilizing digital techniques.

Additionally, prior analog circuits have tended to be deficient because of their sensitivity to incoming spurious signal conditions, for example, noise and the like, thereby affecting their accuracy and dependability. A condition of particular concern arises under noisy incoming signal conditions. Under the noisy signal conditions it has been demonstrated that prior analog constant-percent break interval pulse correctors have erroneously generated a train of output dial pulses. The generation of unwanted dial pulse signals has been designated "dial pulse correcting forever" phenomenon and is extremely undesirable.

A constant-percent break dial pulse correction circuit implemented by employing digital techniques is disclosed in U.S. Pat. No. 3,700,821 issued to B. R. Savage on Oct. 24, 1972. In this arrangement digital up/down counters and associated logic elements are employed to realize the operate and release delay timer functions while digital counters and associated logic elements are employed to realize the make and break time functions. This arrangement is also believed to be sensitive to incoming spurious signal conditions, specifically noise, thereby being susceptible to generating erroneously a train of output dial pulses known as "dial pulse correcting forever". The dial pulse correcting forever phenomenon is possibly initiated in response to incoming noise signals because of interaction between the operate and release delay timers, the up/down counting arrangement of the operate timer, and interaction between the operate timer and the pulse correction make and break timers. Again, erroneous generation of output dial pulses is extremely undesirable and should be avoided.

SUMMARY OF THE INVENTION

The problem of erroneous generation of corrected dial pulses and other problems with the prior art arrangements are overcome in a digital constant-percent break dial pulse corrector of the type including a so-called operate timer as a noise gate by, in accordance with one aspect of the invention, employing a control arrangement in conjunction with a digital up/down counter for controllably changing the maximum count of the counter once a first maximum count has been reached and by generating a narrow output pulse signal for initiating a pulse correction cycle. Specifically, once the first maximum count is reached and an output pulse signal is generated, the count of the counter is changed to a second count lower than the first. The counter is inhibited from counting up until the counter again reaches a prescribed initial count state at which time the first maximum count attainable is reinstated. The time interval required to reach the prescribed initial count from the second maximum count is selected to be of sufficient duration so as not to initiate erroneously generation of another pulse correction initiating output pulse in response to noise signals or the like, while still being able to detect dial pulses having minimum duration make intervals. Consequently, generation of subsequent output pulse signals from the operate timer is inhibited until after the counter again reaches the initial count state. This is realized, in one embodiment of the invention, by controllably resetting predetermined least significant ones of the stages of the counter to their initial count condition.

The possibility of generating erroneous output dial pulses because of malfunctioning of a release timer employed in the pulse corrector is minimized, in accordance with another aspect of the invention, by controlling the output of a supervisory circuit employed in conjunction with the pulse corrector with signals generated internal to the pulse corrector. Specifically, a signal indicative of the operative state of the pulse corrector, i.e., actively generating a corrected dial pulse or not, is employed to control the response of the supervisory circuit either to outputs from the operate and release timers or to an output from the pulse corrector. This function, in conjunction with the pulse correction cycle being initiated by a narrow pulse output signal from the operate timer, completely isolates the constant-percent break pulse corrector from the operate and release functions once a dial pulse correction cycle has been initiated.

Moreover, interaction between the operate timer and release timer has been eliminated thereby preventing any malfunction or erroneous output possibly caused by the release timer erroneously reinitiating an operate timer cycle.

BRIEF DESCRIPTION OF THE DRAWING

These and other objects and advantages of the invention will be more fully understood from the following detailed description of one embodiment of the invention, taken in accordance with the appended drawing in which:

FIGS. 1 and 2, when combined as shown in FIG. 3, is a simplified circuit diagram of a constant-percent break pulse corrector and supervisory control circuit illustrating one embodiment of the invention.

DETAILED DESCRIPTION

Figure 1:
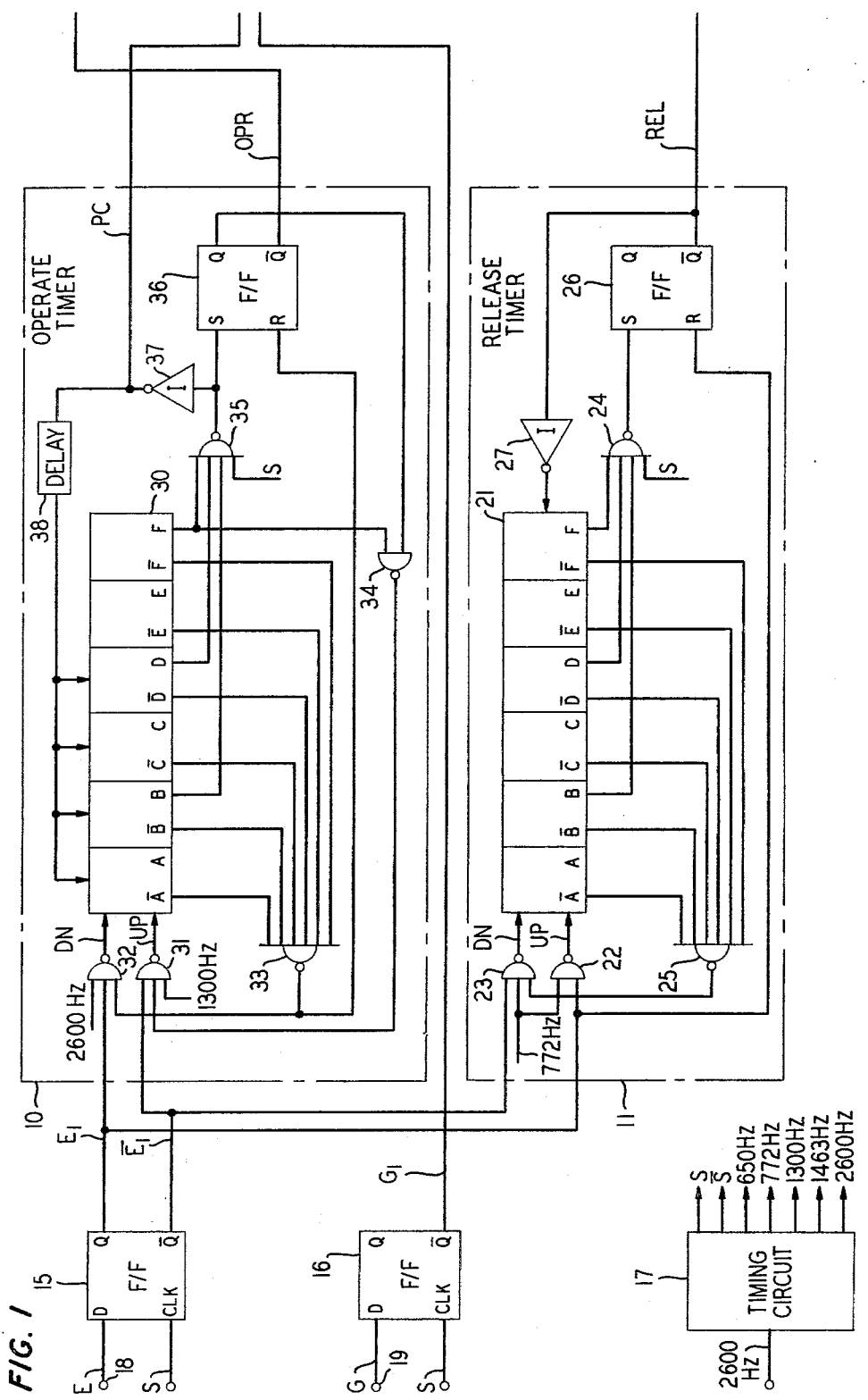

At the outset it should be noted that any of the numerous flip-flop, up/down counter, counter and logic gate elements known in the art may be readily employed in implementing embodiments of the invention. Preferably, elements are employed which are readily implemented in integrated injection logic ($I^2L$) so that the economies of large-scale integration may be realized.

FIGS. 1 and 2 when combined as shown in FIG. 3, illustrate in simplified block form a digital constant-percent break pulse corrector and supervisory control circuit incorporating aspects of the subject invention. The purpose of this embodiment is to generate correctly supervisory signals and to generate dial pulse output signals having a constant-percent break interval. In this example, dial pulses having rates from approximately 7.5 pulses per second (pps) to 12.5 pps are corrected to have a percent break of approximately 56. The circuit includes operate timer 10, release timer 11, pulse corrector 12, supervisory circuit 14, E-lead control flip-flop 15, G-lead control flip-flop 16, and timing circuit 17.

Timing circuit 17 may be any of numerous arrangements known in the art for generating a plurality of timing signals, for example, $\overline{STROBE}$ signal $\overline{S}$, the complement STROBE signal S, 650 Hz clock signal, 772 Hz clock signal, 1300 Hz clock signal, 1463 Hz clock signal and a 2600 Hz clock signal. In this example from experimental practice, the timing signals are derived from a tone signal available in single frequency telecommunications signaling systems, namely a 2600 Hz clock input signal. The S and $\overline{S}$ signals are generated by using inverters. The 2600 Hz clock signal is generated sometime after the STROBE signal by employing a series connection of inverting gates. In this example, the STROBE signal and 2600 Hz tone are of the same polarity so an even number of gates is employed. The remaining clock signals are generated from the 2600 Hz clock signal by employing a plurality of binary rate multipliers which are connected in a manner that would be apparent to those skilled in the art. Signals S and $\overline{S}$ are employed to enable controllably specific ones of the logic elements simultaneously to eliminate possible erroneous generation of pulse outputs.

The input to the pulse corrector and supervisory control circuit is commonly referred to as an E-lead input signal used in telecommunications single frequency signaling systems. The E-lead input signal is a high state pulse signal representative of a logical 1 when an input tone signal is not present and a low state pulse signal representative of a logical 0 when an input tone signal is present. Tone being present is indicative of an idle or on-hook condition, commonly referred to as a broadband state, while no tone is indicative of an active transmission or off-hook condition, commonly referred to as a narrowband state. Once an active transmission is detected, i.e., a narrowband condition, tone bursts are representative of supervisory signals, for example, dial pulses, wink signals, and the like, used in telephone communications signaling systems. The E-lead input pulse signal is supplied via terminal 18 to the D input of flip-flop 15. Flip-flop 15 is a D-type flip-flop of a type now well known in the art. Consequently, in response to a STROBE signal being supplied to the CLK input, signals are generated at output Q ($E_1$) corresponding to the state of the signal supplied to the D input. Signals generated at output $\overline{Q}$ ($\overline{E}_1$) are complements of those generated at output Q. Signals $E_1$ and $\overline{E}_1$ are supplied to operate timer 10 and release timer 11. Signal $E_1$ controls down counting in operate timer 10 and up counting in release timer 11 while signal $\overline{E}_1$ controls up counting in operate timer 10 and down counting in release timer 11.

The G control signal supplied via terminal 19 to the D input of flip-flop 16 controllably enables and disables pulse corrector 12. Initially, the single frequency signaling unit of which this embodiment is a part, is in a so-called idle or broadband state. During the broadband state, signal G is a high state signal and output $\overline{Q}$ from flip-flop 16 is a low state signal $G_1$. The low state signal $G_1$ is supplied to NAND gate 20 thereby disabling pulse corrector 12. Output signals from operate timer 10, therefore, have no effect on pulse corrector 12 until signal $G_1$ is a high state enabling NAND gate 20. Signal $G_1$ becomes a high state immediately upon release timer 11 timing out. This is effected at the termination of a prescribed interval after detection of a no tone state as indicated by $E_1$ being a high state signal. Once release timer 11 generates a low state output signal REL, output signal RALM from supervisory circuit 14 becomes a high state in a manner discussed below. Signal RALM controls circuit arrangements not important to the subject invention to generate a low state signal G which, in turn, causes $G_1$ to be a high state signal upon a STROBE (S) signal being supplied to the CLK input of flip-flop 16. Thus, once release timer 11 times out $G_1$ is a high state signal enabling pulse corrector 12 via NAND gate 20 to respond to outputs from operate timer 10. Release timer 11 continues to generate a low state output signal REL until tone again appears, i.e., signal $E_1$ is a low state signal indicating an on-hook or broadband state.

Release timer 11 is employed to detect the initial transition of the signaling receiver from an idle or broadband state to an active or narrowband state. To this end, release timer 11 includes up/down digital counter 21, up and down count control NAND gates 22 and 23, respectively, count detector NAND gate 24, down count inhibit NAND gate 25, release control flip-flop 26 and inverter 27. Signals $E_1$ and $\bar{E}_1$ are supplied from E-lead control flip-flop 15 to NAND gates 22 and 23, respectively. Signal $E_1$ is also supplied to reset flip-flop 26. Thus, signal $E_1$ controls NAND gate 22 to supply a predetermined clock signal, in this example 772 Hz, to the up count input of counter 21 while signal $\bar{E}_1$ controls NAND gate 23 to supply the 772 Hz clock signal to the down (DN) count input of counter 21. Since the up and down count rates are the same the response of release timer 11 to momentary interruptions in the E-lead signal is the same as when the E-lead signal is present. That is to say, timer 11 integrates in a positive sense (up counts) at the same rate as in a negative sense (down counts). A prescribed up count is detected by NAND gate 24 when, in this example, outputs B, D and F of counter 21 are high states. In response to the next supplied STROBE signal, NAND gate 24 generates a low state output signal which is supplied to set flip-flop 26. In turn, a low state signal REL is generated at output $\bar{Q}$ of release control flip-flop 26. Output REL is supplied via inverter 27 to clear counter 21, and to supervisory circuit 14 to effect generation of a high state RALM signal in a manner discussed below. NAND gate 25 is employed to detect a predetermined minimum down count state of counter 21, in this example zero, as indicated by outputs $\bar{A}$, $\bar{B}$, $\bar{C}$, $\bar{D}$, $\bar{E}$, and $\bar{F}$ being high states. An output from NAND gate 25 is supplied to NAND gate 23 to inhibit the supply of the 772 Hz clock signal and, therefore, inhibit counter 21 from counting below zero.

Release timer 11 operates as a noise gate and delays detection of the initial no-tone E-lead condition, i.e., the transition from a broadband state to a narrowband state. In this example, the delay interval is determined by an up count of 42 which corresponds to an interval of approximately 55 milliseconds. Assuming that the receiver has been in a broadband state, i.e., signal $E_1$ a high state and signal $\bar{E}_1$ a low state, and counter 21 is at the initial state of zero count, then a change in signals $E_1$ and $\bar{E}_1$, to low and high states, respectively, controls counter 21 via NAND gate 22 to count up at the 772 Hz rate. Should there be discontinuities in the E-lead input signal causing signals $E_1$ and $\bar{E}_1$ to fluctuate to high and low states, respectively, counter 21 is controlled via NAND gate 23 to count down at the 772 Hz rate until the discontinuity is terminated or the initial state of zero is reached. Once the desired up count of 42 is reached, NAND gate 24 generates in response to the next STROBE signal S a low state output. The output from NAND gate 24 sets flip-flop 26 to generate a low state signal REL at output $\bar{Q}$. Signal REL is supplied via inverter 27 to clear counter 21 to the initial zero count and to reset flip-flop 39 in supervisory circuit 14. Flip-flop 26 continues to generate a low state signal REL until flip-flop 26 is reset by $E_1$ being a low state signal. The low state $E_1$ signal resets flip-flop 26 to an initial state of a high state signal REL at output $\bar{Q}$.

Operate timer 10 is employed essentially as a noise gate and generates a so-called operate delay interval for an applied E-lead input dial pulse signal. That is to say, generation of an output pulse signal is delayed for the operate delay interval during which signal perturbations are likely to occur. If the E-lead input pulse is not present for an interval equal to the operate delay no output pulse is generated. In this example, the operate delay interval is selected to be approximately 33 milliseconds, which corresponds to a minimum break interval of a dial pulse. Additionally, it is important that operate timer 10 recycle to its initial prescribed count condition in sufficient time in order to detect dial pulses separated by a predetermined minimum make interval, in this example, approximately 12 milliseconds. This recycle time is also selected to be of sufficient duration so as not to initiate erroneously generation of a pulse correction initiation pulse in response to noise and the like.

Operate timer 10 includes up/down counter 30, up and down count control NAND gates 31 and 32, respectively, down count inhibit NAND gate 33, up count inhibit NAND gate 34, maximum count detector NAND gate 35, operate output control flip-flop 36, inverter 37, and delay unit 38. Operate timer 10 responds to control signals from D-type flip-flop 15 to count up when output $\bar{Q}$ ($\bar{E}_1$) is a high state signal and to count down when output Q ($E_1$) is a high state signal. A dial pulse, for example, is represented by tone being present and, consequently, the E-lead signal is a low state ($\bar{E}_1$ is high) during the dial pulse break interval. The dial pulse make interval is represented by no tone being present ($E_1$ is high). Since the minimum break interval is different from the minimum make interval, the integration rates, i.e., up count for break and down count for make, are different. Assuming that no tone has been received for some time greater than 55 milliseconds, in this example, causes the receiver to be in the narrowband condition and counter 30 to be in an initial state of zero count as detected by NAND gate 33 generating a low state output. Then, down count control NAND gate 32 is inhibited by the low state output from NAND gate 33 while NAND gate 31 is inhibited by signal $\bar{E}_1$ being a low state. When a tone is received, the E-lead input signal is terminal 18 is a low state signal and signal $E_1$ is a high state. Consequently, NAND gate 31 is enabled to supply a predetermined CLK signal from timing circuit 17, in this example 1300 Hz, to the up count input of counter 30. Assuming that there are no breaks, gaps or momentary interruptions, i.e., low to high state transitions in the E-lead input, counter 30 will count up at the predetermined clock rate of 1300 Hz until a predetermined first maximum count state is reached as indicated, in this example, by outputs B, D and F being high state signals are detected by NAND gate 35, which, in turn, generates a low state output in response to the next STROBE signal S from timing circuit 17. Once the first maximum up count is reached, in this example a count of 42 which corresponds to an interval of approximately 33 milliseconds, NAND gate 34 is enabled via output F of counter 30 and output Q from flip-flop 36 and generates a low state output. Output $\bar{Q}$ of flip-flop 36 is operate control signal OPR and is supplied to reset flip-flop 39 in supervisory circuit 14. In turn, the low state output from NAND gate 34 inhibits NAND gate 31 from supplying the predetermined 1300 Hz clock signal to the up count input of counter 30. Thus, counter 30 is inhibited from counting up beyond the first maximum count of 42. However, NAND gate 33 is disabled which, in turn, partially enables down count NAND gate 32. Thus, when the E-lead signal supplied to terminal 18 momentarily or intermittently or continuously changes state from a low state signal to a high state signal, a second predetermined clock signal is supplied via NAND gate 32, in this example a 2600 Hz signal, to the down count input of counter 30. Thus, it is seen that counter 30 could possibly be caused to count up and down intermittently in response to momentary interruptions or changes of state in the E-lead input signal. If this were allowed to occur, possible erroneous output pulse signals would be generated at the output of NAND gate 35 which, in turn, would cause erroneous dial pulses or the like to be generated by pulse corrector 12. It has been determined that this type of problem usually occurs under noisy input conditions and has been demonstrated to occur in the laboratory with prior existing commercially available analog constant percent break signaling units. This problem is primarily overcome, in accordance with an aspect of the present invention, by controllably generating a single "narrow" output pulse $\overline{PC}$ at the output of NAND gate 35 at the termination of each operate delay interval and by controllably inhibiting the generation of any additional output pulses from NAND gate 35 until counter 30 is again first reset to its initial prescribed count conditions, in this example zero. The narrow output pulse ($\overline{PC}$) from NAND gate 35 is employed to set operate control flip-flop 36, to initiate operation of pulse corrector 12 via inverter 27 (PC) and NAND gate 20, and to controllably reset counter 30 via inverter 37 and delay unit 38 to a prescribed count. The narrow pulse signal is generated by supplying the output from NAND gate 35 via inverter 37 and delay unit 38 to controllably reset prescribed stages of counter 30. The delay duration is selected to obtain a desired output pulse width, for example gate delay intervals of approximately 1 to 2 nanoseconds each, and which is realized by employing a series connection of an even number of gate elements, in one example four. This resets counter 30 substantially instantaneously to a second count lower than the first maximum up count, in this example 42, to a so-called second maximum up count, in this example a count of 32. In some applications, the response of the counter to a reset input may be sufficiently slow to obtain an output pulse signal having a sufficient pulse width to control initiation of the other circuit functions and use of a separate delay is not necessary. In this example, only a predetermined number of least significant stages of counter 30 are reset, specifically, stages A, B, C and D. Thus, outputs B and D of counter 30 are reset to low state signals and NAND gate 35 is controllably disabled. Since only the least significant stages, i.e., A, B, C and D, of counter 30 have been reset, output F of counter 30 is still a high state signal and output Q of flip-flop 36 is a high state signal. Therefore, NAND gate 34 remains enabled and, in turn, inhibits further up counting beyond the second maximum up count, in this example, a count of 32. Thus, if for some reason counter 30 is caused to count down from the first maximum up count, it still is inhibited from further up counting until flip-flop 36 is reset by a low state output from NAND gate 33 indicating that counter 30 has reached its initial prescribed count of zero. Thus, the inputs to NAND gate 35 cannot again be all high state signals and no further output pulse signal can be generated to initiate a pulse correction cycle. This condition subsists until counter 30 again counts down to its initial count condition of zero. Thus, in accordance with another aspect of the invention, erroneous generation of additional pulse correction initiation signals (PC) is inhibited once a pulse correction initiation signal (PC) has been generated at the termination of the operate delay interval. Once a valid E-lead input has been detected and counter 30 reset to the second maximum up count of 32, the E-lead signal must be in a low state for at least approximately 12 milliseconds for counter 30 to revert to the initial zero count. This corresponds to the minimum make interval, i.e., minimum interval between successive dial pulses. As indicated above, counter 30 is not reset or recycled more rapidly in order to minimize possible erroneous generation of pulse correction initiation pulse signals.

Moreover, in this embodiment of the invention there is no interaction between release timer 11 and operate timer 10 as in the prior art arrangement disclosed in U.S. Pat. No. 3,700,821. Therefore, possible generation of erroneous pulse correction initiation signals caused by the inadvertent resetting of the operate timer is eliminated.

Pulse corrector 12 is employed to generate output dial pulse signals having a constant-percent break interval. That is to say, the break interval is a constant percent of the dial pulse period, i.e., break plus make intervals. The operation of pulse corrector 12 is similar to that of the pulse corrector employed in U.S. Pat. No. 3,700,821 noted above. One significant difference, however, is that once enabled to generate a dial pulse, pulse corrector 12 is completely isolated from operate timer 10 until generation of the dial pulse is completed. This is realized by employing NAND gate 20 and enable flip-flop 40 to be discussed below. Another difference is that pulse corrector 12 is also isolated from the supervisory operate and release functions controlled by operate timer 10 and release timer 11. This isolation is achieved in part by utilizing signals generated internal to pulse corrector 12 for controlling supervisory circuit 14 to respond either to an output from operate release flip-flop 39 or to output MAKE (output $\overline{Q}$) from pulse corrector flip-flop 41. This control is achieved, in accordance with an aspect of the invention by sensing the operative state of pulse corrector 12, i.e., whether it is in a pulse correcting mode or not, and will become apparent to those skilled in the art from the detailed discussion of pulse corrector 12. This is important so that operate timer 10 and/or release timer 11 cannot cause dial pulses to be generated erroneously during noisy input conditions.

Pulse corrector 12 includes enable NAND gate 20, enable flip-flop 40, make flip-flop 41, output control NAND gate 42, break digital counter 43, make digital counter 44, count control NAND gates 45, 46, 47 and 48, break output detector NAND gate 49, make output detector NAND gate 50, and inverters 51 and 52.

Pulse corrector 12 operates, in this example, to generate output dial pulse signals having a substantially constant-percent break interval of approximately 56 percent. If other percent break intervals are desired they may be realized by adjusting frequencies of clock signals supplied to counters 43 and 44 in a manner which will be apparent from the following discussion. It is anticipated that incoming dial pulse rates range from 7.5 pulses per second (pps) to 12.5 pps. Notwithstanding this range of incoming pulses, the instant pulse corrector can correct for pulse rates of up to approximately 17 pps. However, the reset interval of operate timer 10 limits the rate to the above-noted 12.5 pps. Digital counter 43 and associated logic elements form a so-called dual timing rate delay timer while digital counter 44 and associated logic elements form a so-called single rate delay timer. Counter 43 and the associated logic elements are operative to generate an interval equal to the minimum delay an output dial pulse may have under the slowest input dial pulse rate and still correct to the desired constant percent break, in this example, 56 percent.

Control of two clock signals having predetermined rates supplied to counter 43 via the associated logic, in conjunction with make counter 44 and its associated logic, effects the desired constant percent break over the noted range of incoming dial pulses. To this end, enable flip-flop 40 generates first and second enable control signals at outputs Q and $\overline{Q}$, respectively, which operatively control the supply of predetermined clock signals via NAND gates 45, 46 and 47 to counters 43 and 44. Initially, first and second counters 44 and 43, respectively, are at a zero count state. Flip-flop 40 is initially in the reset state and is generating a low state signal at output Q and a high state signal at output $\overline{Q}$. Similarly, make flip-flop 41 is also initially in the reset state and is generating a low state signal at output Q and a high state signal at output $\overline{Q}$. Consequently, NAND gate 48 is disabled and output control NAND gate 42 is enabled. The output from control NAND gate 42 is a so-called "activate and cut" output control signal designated ACT and controls, in accordance with an aspect of this invention, supervisory circuit 14 to select for output RALM either output MAKE from pulse corrector 12 or the supervisory operate (OPR) or release (REL) functions from operate timer 10 or release timer 11, respectively. Consequently, the release function is totally isolated from the pulse correction function and cannot inadvertently initiate generation of unwanted output dial pulse signals.

Assuming signal $G_1$ is a high state, a pulse correction cycle is initiated when positive pulse signal PC is supplied from operate timer 10 via NAND gate 20 to set flip-flop 40 to generate a high state signal at output Q and a low state signal at output $\overline{Q}$. Consequently, control NAND gate 42 is disabled thereby controlling supervisory circuit 14 to respond to output MAKE from pulse corrector 12. Additionally, NAND gates 45 and 46 are enabled while NAND gate 47 is disabled and a predetermined clock signal, in this example, a 650 Hz signal is supplied to make counter 44. NAND gate 48 is disabled by output Q from flip-flop 41. Thus, a second predetermined clock signal, in this example a 1463 Hz signal is not presently supplied to counter 43. Upon counter 44 attaining a predetermined count detected by NAND gate 50 when outputs B, C and F are all high state signals corresponding to a count of 38 which represents an interval of approximately 58.7 milliseconds, flip-flop 41 is set while flip-flop 40 is reset. Counter 44 is cleared by the output from NAND gate 50 supplied via inverter 51. This, in turn, causes the output from NAND gate 50 to be a narrow width negative pulse signal. Outputs Q and $\overline{Q}$ of flip-flop 41 are high and low state signals, respectively, while outputs Q and $\overline{Q}$ of flip-flop 40 are low and high state signals, respectively. The low state signal from output $\overline{Q}$ of flip-flop 41 continues to disable NAND gate 42, which continues to generate a high state output indicating that pulse corrector 12 continues to be in an active pulse correction state, thereby controlling supervisory circuit 14 to respond to output MAKE of pulse corrector 12. Additionally, NAND gate 48 is enabled by the high state signal from output Q of flip-flop 41 and NAND gate 47 is enabled by the high state signal from output $\overline{Q}$ from flip-flop 40. Therefore, a 650 Hz clock signal is supplied to counter 43. If no additional dial pulse tone bursts are received the 650 Hz clock signal continues to be supplied to counter 43 until a predetermined count is reached, in this example a count of 49 which corresponds to an interval of approximately 75 milliseconds.

The count of 49 is detected by NAND gate 49 when outputs A, E and F of counter 43 are all high state signals. The low state output generated by NAND gate 43 when the count of 49 is reached is supplied to reset flip-flop 41 and via inverter 52 to clear counter 43. Thus, the output from NAND gate 49 is a narrow width negative pulse. When flip-flop 41 is reset, output Q becomes a low state signal and output $\overline{Q}$ becomes a high state signal. The low state output Q from flip-flop 41, in turn, disables NAND gate 48 and no additional clock pulse signals are supplied to counter 43. Since both outputs $\overline{Q}$ of flip-flop 40 and 41 are again high state signals, NAND gate 42 is enabled to generate a low state ACT output which, in turn, controls supervisory circuit 14 to again respond to the output from operate release control flip-flop 39 and to ignore output MAKE from pulse corrector 12. Thus, when only one dial pulse is received the output of pulse corrector 12 is a pulse signal having width of approximately 75 milliseconds. This also corresponds to the last pulse in a series of dial pulses.

Assuming now that a series of dial pulses are received, operation for the first dial pulse in that series is the same as for the single dial pulse except that in response to the second or next subsequent dial pulse, as indicated by another positive pulse PC being supplied from operate timer 10, flip-flop 40 is again set via the low state output from NAND gate 20. This again enables NAND gates 45 and 46 while disabling NAND gate 47. Consequently, the 650 Hz signal was supplied to counter 43 during the interval from flip-flop 41 being initially set via the output from NAND gate 50, i.e., upon counter 44 attaining an initial count of 38 (58.5 milliseconds), until the next enabling pulse PC from operate timer 10. Upon receiving the next enabling pulse PC from operate timer 10, the 650 Hz clock signal is controllably supplied to counter 44 while a second predetermined clock signal, in this example 1463 Hz, is supplied via NAND gates 46 and 48 to counter 43. Consequently, counter 43 reaches the predetermined count of 49 more rapidly than with the 650 Hz signal. When counter 43 again reaches a count of 49 flip-flop 41 is reset and operation of pulse corrector 12 is iterated until the last dial pulse in the series is received. The last dial pulse as indicated above, is not corrected and a pulse of approximately 75 milliseconds duration is generated in a manner similar to that for the single pulse input described above.

It is again noted that control signal ACT is a high state when either or both output MAKE and enable output $\overline{Q}$ of flip-flop 40 are low states. Consequently, supervisory circuit 14 is controlled to respond to output MAKE of pulse corrector 12 when either the make timer and/or the break timer is timing.

The ratio of the frequencies of the clock signals supplied to counter 43 is selected to obtain the desired constant-percent break interval, in this example 56 percent break. As described in U.S. Pat. No. 3,700,821, the ratio of the frequencies of the clock signals supplied to counter 43, i.e., F1=650 Hz and F2=1463 Hz, and the frequency of the clock signal, i.e., F1, supplied to make counter 44, is F1/F2=R, where R=(1-percent break). Thus in this example, R=0.44 and 1/R=F2/F1=2.25, and F2/F1=1463/650≈2.25. Frequency F1 is selected in relationship to the minimum incoming pulse repetition rate, in this example, 7.5 pps, while frequency F2 is selected in relationship to the maximum incoming pulse rate, in this example 12.5 pps.

Supervisory circuit 14 is utilized to generate supervisory control signals employed in telecommunications inband signaling systems and to pass the corrected dial pulses having a constant percentage break interval. To this end, supervisory circuit 14 includes operate/release flip-flop 39, control NAND gates 53, 55 and 56, inverter 54, and D-type flip-flop 57. Operate control signal OPR is supplied from operate timer 10 to the set (S) input of flip-flop 39 while release control signal REL is suplied from release timer 11 to the reset (R) input of flip-flop 39. Output $\overline{Q}$ of flip-flop 39 is supplied to one input of NAND gate 55. Output ACT from pulse corrector 12 is supplied to one input of NAND gate 53, and via inverter 54 to a second input of NAND gate 55 and to the cut output of supervisory circuit 14. The cut output signal is employed as desired to enable or disable other circuit functions either during reception of supervisory signals or during active generation of corrected dial pulses. Consequently, noise and the like may be inhibited from being transmitted during dial pulse correction intervals. Output MAKE from the pulse corrector 12 is supplied to a second input of NAND gate 53. Outputs from NAND gates 53 and 55 are supplied to inputs of NAND gate 56. In turn, an output from NAND gate 56 is supplied to the D input of flip-flop 57. Output Q of flip-flop 57 is signaling control output RALM. As indicated above, supervisory circuit 14 is controlled via signal ACT to respond either to the operate/release control signal generated at output $\overline{Q}$ of flip-flop 309 or to the MAKE output of pulse corrector 12. When signal ACT is a high state signal indicating that pulse corrector 12 is actively generating a corrected dial pulse, NAND gate 53 is enabled while NAND gate 55 is disabled by the output from inverter 54. The output of NAND gate 55 is a high state signal which enables NAND gate 56 to respond to the output of NAND gate 53. Thus, when output MAKE of pulse corrector 12 is a high state signal, the output of NAND gate 53 is a low state signal and the output of NAND gate 56 is a high state signal which causes flip-flop 57 to generate a high state output RALM in response to the next $\overline{STROBE}$ ($\overline{S}$) signal from timing circuit 17. Similarly, when output MAKE from pulse corrector 12 is a low state signal the output from NAND gate 53 is a high state signal causing the output of NAND gate 56 to be a low state signal which, in turn, causes flip-flop 57 to generate a low state RALM signal in response to the next $\overline{S}$ signal. When signal ACT is a low state signal pulse corrector 12 is not actively generating a corrected dial pulse and control of supervisory circuit 14 is relinquished to flip-flop 39. This is effected by NAND gate 53 being disabled by the low state output ACT from NAND gate 42 and NAND gate 55 being enabled by the high state output from inverter 54. Consequently, flip-flop 57 is controlled via NAND gates 55 and 56 to generate RALM output signals corresponding to the state of output $\overline{Q}$ of flip-flop 39. Thus, when output $\overline{Q}$ of flip-flop 39 is a high state signal in response to a low state REL output signal RALM is a high state signal, and when the $\overline{Q}$ output of flip-flop 39 is a low state signal in response to a low state OPR signal output RALM is a low state signal.

It is seen that only pulse corrector 12 can control supervisory circuit 14 via signal ACT to pass corrected output dial pulses and, consequently, the possibility of initiating a so-called dial pulse generating forever state of operation is effectively eliminated.

I claim:

1. A constant-percent break pulse corrector (FIGS. 1 and 2) of the type including a source (17) of first clock pulses having a predetermined first frequency selected in relationship to a minimum incoming pulse rate, a source (17) of second clock pulses having a predetermined second frequency selected in relationship to a maximum incoming pulse rate, an operate timer (10) including an up/down counter (30) for generating a first output in response to reception of an incoming pulse for more than a prescribed interval, a make timer (44, 45, 50, 51) including a first digital counter (44) and being jointly responsive to the first output and the first clock pulses for generating a second output at the termination of a predetermined counting cycle, a break timer (43, 46, 47, 48, 49, 52) including a second digital counter (43) for generating a third output upon termination of a predetermined counting cycle, means (20, 40, 41, 46, 47, 48) for initially supplying in response to said second output the first clock pulses to the second digital counter (43) and subsequently in response to the first output (PC) supplying the second clock pulses to the second counter (43) for an interval terminated by generation of the third output, and means (41) responsive to the second and third outputs for generating an output pulse chain (MAKE), characterized by control means (33 through 38) in circuit with the operate timer (10) up/down counter (30) for controllably changing the count of the up/down counter (30) from a first maximum count to a second count in response to the first output and for subsequently controllably changing the count attainable of the operate timer (10) up/down counter (30) to the first maximum count upon the up/down counter (30) reaching a prescribed count state thereby inhibiting generation of subsequent ones of said first outputs (PC) until after the prescribed count state of the up/down counter (30) is attained.

2. A constant-percent break pulse corrector as defined in claim 1, wherein said control means further effects generation of said first output as a narrow width pulse correction initiation output pulse (PC) upon the up/down counter (30) reaching the first maximum count and resetting the up/down counter (30) to the second count.

3. A constant-percent break pulse corrector as defined in claim 2, wherein said control means further includes first logic means (31, 34, 36) for controllably inhibiting a supply of up count clock pulses to the operate timer (10) up/down counter (30) upon generation of the first output (from 35), and second logic means (33) responsive to outputs ($\overline{A}$–$\overline{F}$) from the up/down counter (30) for resetting the first logic means (via 36) to an initial condition thereby again enabling the supply of the up count clock pulses to the operate timer (10) up/-down counter (30) until the first maximum count (for example, 42) is again reached.

4. A constant-percent break pulse corrector of the type defined in claim 2, wherein said control means further includes means (38) having a predetermined delay interval for delaying resetting of the predetermined stages of the counter in order to obtain said first output (PC) having a predetermined pulse width.

5. A constant-percent break pulse corrector of the type defined in claim 1, further including a supervisory circuit (14) responsive to output signals from the operate timer (10, OPR), release timer (11, REL) and the pulse corrector logic arrangement (41, MAKE) for controlling the supervisory circuit (14) to pass signals representative of either the operate timer output (OPR) and release timer output (REL) or the output pulse train (MAKE) of the pulse corrector.

6. A constant-percent break pulse corrector of the type defined in claim 5, further including means (40, 41, 42) for generating a control signal (ACT) representative of the operative state of the pulse corrector (12), said control signal (ACT) being supplied to said supervisory circuit (14) to control selection of either the operate timer output (OPR) and release timer output (REL) or the pulse corrector output chain (MAKE via 53) depending on whether the pulse corrector (12) is actively correcting a pulse or not, respectively.

7. A constant-percent break pulse corrector of the type defined in claim 6, wherein said control signal generating means includes means (42) responsive to the output pulse train (MAKE) from the pulse corrector logic arrangement (41) and to a predetermined pulse correction cycle enable signal ($\overline{Q}$ of 40) for generating the control signal (ACT) to control said supervisory circuit (14) to respond either to the output pulse train (MAKE) or the operate (OPR) and release (REL) timer output signals, respectively.

8. A constant-percent break pulse corrector of the type defined in claim 7, further including enable control means (20, 40) responsive to said first output (PC) for generating first and second enable control signals (Q, $\overline{Q}$ of 40), said first enable control signal (Q of 40) controlling the supply of said first clock pulses to the first digital counter (44) and the second clock pulses to the second digital counter (43), and said second enable signal ($\overline{Q}$ of 40) controlling the supply of the first clock pulses to the second counter (43), said second enable control signal ($\overline{Q}$ of 40) being supplied to said output control means (42) and, in conjunction with the pulse corrector output pulse chain (MAKE) generating the control signal (ACT) representative of the operative state of the pulse corrector (12).

* * * * *